US010129821B2

(12) United States Patent
Han et al.

(10) Patent No.: US 10,129,821 B2
(45) Date of Patent: Nov. 13, 2018

(54) MULTICHANNEL RADIO FREQUENCY APPARATUS AND METHOD

(71) Applicant: Huawei Technologies Co., Ltd., Shenzhen, Guangdong (CN)

(72) Inventors: Dong Han, Chengdu (CN); Zhiyong Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 15/280,515

(22) Filed: Sep. 29, 2016

(65) Prior Publication Data
US 2017/0019847 A1    Jan. 19, 2017

Related U.S. Application Data

(63) Continuation of application No. PCT/CN2014/074374, filed on Mar. 31, 2014.

(51) Int. Cl.
*H04W 48/18* (2009.01)
*H04W 88/10* (2009.01)
(Continued)

(52) U.S. Cl.
CPC .......... *H04W 48/18* (2013.01); *H04B 7/0413* (2013.01); *H04W 36/0066* (2013.01); *H04W 88/10* (2013.01)

(58) Field of Classification Search
CPC . H04W 48/18; H04W 36/0066; H04W 88/10; H04B 7/0413
See application file for complete search history.

(56) References Cited

U.S. PATENT DOCUMENTS 6,317,583 B1 * 11/2001 Wolcott ............. H04B 7/18539
370/318
2005/0064892 A1    3/2005 Cavin
(Continued)

FOREIGN PATENT DOCUMENTS

CN    101170333 A    4/2008
CN    101188590 A    5/2008
(Continued)

*Primary Examiner* — Pao Sinkantarakorn
*Assistant Examiner* — Kabir U Jahangir

(57) ABSTRACT

A multichannel radio frequency apparatus and method are disclosed. The apparatus includes a digital baseband unit and at least one transmission subsystem, and the subsystem includes: digital up converters, configured to up-convert baseband signals generated; a digital combiner, configured to up-convert M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal; a DAC, configured to convert the ultra-wideband high frequency digital signal into an ultra-wideband high frequency analog signal; an analog splitter, configured to split the ultra-wideband high frequency analog signal into M channels of high frequency analog signals; and radio frequency transmitting circuits, configured to transmit the analog radio frequency signals by using radio frequency antennas.

19 Claims, 5 Drawing Sheets

(51) Int. Cl.
*H04W 36/00* (2009.01)
*H04B 7/0413* (2017.01)

(56) References Cited

U.S. PATENT DOCUMENTS

2009/0290659 A1* 11/2009 Petrovic ................ H04H 20/30
375/340
2010/0136927 A1    6/2010 Rofougaran
2013/0301619 A1* 11/2013 Singh ................ H04W 56/004
370/336

FOREIGN PATENT DOCUMENTS

| CN | 101340256 A | 1/2009 |
| CN | 201256398 Y | 6/2009 |
| CN | 102170715 A | 8/2011 |
| CN | 102315858 A | 1/2012 |
| CN | 102347779 A | 2/2012 |
| CN | 102752056 A | 10/2012 |
| CN | 103033203 A | 4/2013 |

* cited by examiner

MULTICHANNEL RADIO FREQUENCY APPARATUS AND METHOD

CROSS-REFERENCE TO RELATED APPLICATIONS

This application is a continuation of International Application No. PCT/CN2014/074374, filed on Mar. 31, 2014, the disclosure of which is hereby incorporated by reference in its entirety.

TECHNICAL FIELD

The present invention relates to the field of communications technologies, and in particular, to a multichannel radio frequency apparatus and method.

BACKGROUND

A development trend of mobile communications is a broadband technology. Currently, a multiple-input multiple-output (Multiple-Input Multiple-Output, MIMO) technology is mainly used to improve system bandwidth. The MIMO technology needs to be supported by a multi-antenna technology. Currently, an eight-antenna technology has been used commercially, and with the appearance of fifth-generation mobile communications technologies, a larger-scale antenna array will appear. In this case, an ultra-large-scale antenna array that follows causes a rapid increase in a quantity of radio frequency channels in an ultra radio frequency system. Therefore, how to simplify a radio frequency system and how to reduce a quantity of radio frequency components in the radio frequency system are main design directions of a future radio frequency system.

As main components of a radio frequency channel, an analog to digital converter (Analog to digital converter, ADC) and a digital to analog converter (Digital to analog converter, DAC) are very expensive.

In the prior art, in a reception direction of a radio frequency system, an intermediate frequency combination technology is used to reduce a quantity of ADCs, that is, a received radio frequency carrier signal is down-converted by using a mixer, to move the radio frequency carrier signal to an intermediate frequency, and radio frequency carrier signals received on multiple channels are combined into a channel of broadband signal, so that sampling can be performed by using only one high-speed ADC, thereby reducing the quantity of ADCs. However, because intermediate frequency bandwidth is limited, a quantity of channels that can be combined is limited by the intermediate frequency bandwidth. Currently, the intermediate frequency bandwidth is usually less than 1 GHz, but in future wireless communications, bandwidth of each channel will exceed 400 MHz. Therefore, the foregoing intermediate frequency combination technology supports combination of two channels at most, a quantity of ADCs is reduced by half at most, and a quantity of reduced ADCs is very limited.

SUMMARY

Embodiments of the present invention provide a multichannel radio frequency apparatus and method, to resolve a problem of how to simplify a radio frequency apparatus and reduce a quantity of components in the radio frequency apparatus.

A first aspect of the present invention provides a multichannel radio frequency apparatus, where the apparatus includes a digital baseband unit and at least one transmission subsystem, and the transmission subsystem includes: M digital up converters connected to the digital baseband unit, a digital combiner connected to the M digital up converters, a digital to analog converter DAC connected to the digital combiner, an analog splitter connected to the DAC, M radio frequency transmitting circuits connected to the analog splitter, and M radio frequency antennas respectively connected to the M radio frequency transmitting circuits, where M is an integer greater than or equal to 2; the digital up converters are configured to up-convert baseband signals generated by the digital baseband unit into digital radio frequency signals whose frequencies are less than 30 GHz; the digital combiner is configured to obtain M channels of digital radio frequency signals from the M digital up converters, up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal; the DAC is configured to convert the ultra-wideband high frequency digital signal into an ultra-wideband high frequency analog signal; the analog splitter is configured to split the ultra-wideband high frequency analog signal into M channels of high frequency analog signals, down-convert the M channels of high frequency analog signals into M channels of analog radio frequency signals whose frequencies are less than 30 GHz, and respectively output the M channels of analog radio frequency signals to the M radio frequency transmitting circuits; and the radio frequency transmitting circuits are configured to transmit the received analog radio frequency signals by using the radio frequency antennas.

In a first possible implementation manner, the digital combiner is specifically configured to up-convert the M channels of digital radio frequency signals into a microwave frequency band whose frequency is between 30 GHz and 100 GHz; the DAC is a high frequency DAC applicable to the microwave frequency band; and the analog splitter is a high frequency splitter applicable to the microwave frequency band.

In a second possible implementation manner, the digital combiner is specifically configured to up-convert the M channels of digital radio frequency signals into an optical frequency band whose frequency is greater than 167 THz; the DAC is an optical-to-electrical DAC applicable to the optical frequency band; and the analog splitter is an optical-to-electrical splitter applicable to the optical frequency band.

With reference to the first aspect or the first or second possible implementation manner of the first aspect, in a third possible implementation manner, the analog splitter includes: a filter, configured to filter the ultra-wideband high frequency analog signal, to obtain the M channels of high frequency analog signals; and a frequency converter, configured to down-convert the M channels of high frequency analog signals into a radio frequency band whose frequency is less than 30 GHz, to obtain the M channels of analog radio frequency signals.

A second aspect of the present invention provides a multichannel radio frequency apparatus, where the apparatus includes a digital baseband unit and at least one receiving subsystem, and the receiving subsystem includes: M radio frequency antennas, M radio frequency receiving circuits respectively connected to the M radio frequency antennas, an analog combiner connected to the M radio frequency receiving circuits, an analog to digital converter ADC connected to the analog combiner, a digital splitter connected to the ADC, and M digital down converters connected to the digital splitter, where the M digital down converters are connected to the digital baseband unit, and M is an integer greater than or equal to 2; the radio frequency receiving circuits are configured to receive analog radio frequency signals by using the radio frequency antennas; the analog combiner is configured to up-convert M channels of analog radio frequency signals received by the M radio frequency receiving circuits into a high frequency band whose frequency is greater than or equal to 30 GHz, to obtain M channels of high frequency analog signals, and combine the M channels of high frequency analog signals into a channel of ultra-wideband high frequency analog signal; the ADC is configured to convert the ultra-wideband high frequency analog signal into an ultra-wideband high frequency digital signal; the digital splitter is configured to split the ultra-wideband high frequency digital signal into M channels of high frequency digital signals, down-convert the M channels of high frequency digital signals into M channels of digital radio frequency signals whose frequencies are less than 30 GHz, and respectively output the M channels of digital radio frequency signals to the M digital down converters; and the digital down converters are configured to down-convert the received digital radio frequency signals into baseband signals, and send the baseband signals to the digital baseband unit.

In a first possible implementation manner, the analog combiner is specifically configured to up-convert the M channels of analog radio frequency signals into a microwave frequency band whose frequency is between 30 GHz and 100 GHz; and the ADC is a high frequency ADC applicable to the microwave frequency band.

In a second possible implementation manner, the analog combiner is specifically configured to up-convert the M channels of analog radio frequency signals into an optical frequency band whose frequency is greater than 167 THz; and the ADC is an optical-to-electrical ADC applicable to the optical frequency band.

With reference to the first aspect or the first or second possible implementation manner of the first aspect, in a third possible implementation manner, the digital splitter includes: a filter, configured to filter the ultra-wideband high frequency digital signal, to obtain the M channels of high frequency digital signals; and a frequency converter, configured to down-convert the M channels of high frequency digital signals into a radio frequency band whose frequency is less than 30 GHz, to obtain the M channels of digital radio frequency signals.

A third aspect of the present invention provides a multichannel radio frequency transmission method, including: up-converting M channels of baseband signals into M channels of digital radio frequency signals whose frequencies are less than 30 GHz; up-converting the M channels of digital radio frequency signals into a high frequency band whose frequency is greater than or equal to 30 GHz, to obtain M channels of high frequency digital signals, and combining the M channels of high frequency digital signals into a channel of ultra-wideband high frequency digital signal; converting the ultra-wideband high frequency digital signal into an ultra-wideband high frequency analog signal; splitting the ultra-wideband high frequency analog signal into M channels of high frequency analog signals, and down-converting the M channels of high frequency analog signals into M channels of analog radio frequency signals whose frequencies are less than 30 GHz; and respectively transmitting the M channels of analog radio frequency signals by using M radio frequency antennas.

In a first possible implementation manner, the up-converting the M channels of digital radio frequency signals into a high frequency band whose frequency is greater than or equal to 30 GHz includes: up-converting the M channels of digital radio frequency signals into a microwave frequency band whose frequency is between 30 GHz and 100 GHz.

In a second possible implementation manner, the up-converting the M channels of digital radio frequency signals into a high frequency band whose frequency is greater than or equal to 30 GHz includes: up-converting the M channels of digital radio frequency signals into an optical frequency band whose frequency is greater than 167 THz.

A fourth aspect of the present invention provides a multichannel radio frequency receiving method, including: receiving M channels of analog radio frequency signals; up-converting the M channels of analog radio frequency signals into a high frequency band whose frequency is greater than or equal to 30 GHz, to obtain M channels of high frequency analog signals, and combining the M channels of high frequency analog signals into a channel of ultra-wideband high frequency analog signal; converting the ultra-wideband high frequency analog signal into an ultra-wideband high frequency digital signal; splitting the ultra-wideband high frequency digital signal into M channels of high frequency digital signals, and down-converting the M channels of high frequency digital signals into M channels of digital radio frequency signals whose frequencies are less than 30 GHz; and down-converting the M channels of digital radio frequency signals into M channels of baseband signals, and sending the M channels of baseband signals to a digital baseband unit.

In a first possible implementation manner, the up-converting the M channels of analog radio frequency signals into a high frequency band whose frequency is greater than or equal to 30 GHz includes: up-converting the M channels of analog radio frequency signals into a microwave frequency band whose frequency is between 30 GHz and 100 GHz.

In a second possible implementation manner, the up-converting the M channels of analog radio frequency signals into a high frequency band whose frequency is greater than or equal to 30 GHz includes: up-converting the M channels of analog radio frequency signals into an optical frequency band whose frequency is greater than 167 THz.

A fifth aspect of the present invention provides a multichannel radio frequency receiving apparatus, where the apparatus includes a digital baseband unit, at least one transmission subsystem, and at least one receiving subsystem, where the transmission subsystem includes:

M digital up converters connected to the digital baseband unit, a digital combiner connected to the M digital up converters, a digital to analog converter DAC connected to the digital combiner, an analog splitter connected to the DAC, M radio frequency transmitting circuits connected to the analog splitter, and M radio frequency transmit antennas respectively connected to the M radio frequency transmitting circuits, where M is an integer greater than or equal to 2; the digital up converters are configured to up-convert baseband signals generated by the digital baseband unit into digital radio frequency signals whose frequencies are less than 30 GHz; the digital combiner is configured to obtain M channels of digital radio frequency signals from the M digital up converters, up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal; the DAC is configured to convert the ultra-wideband high frequency digital signal into an ultra-wideband high frequency analog signal; the analog splitter is configured to split the ultra-wideband high frequency analog signal into M channels of high frequency analog signals, down-convert the M channels of high frequency analog signals into M channels of analog radio frequency signals whose frequencies are less than 30 GHz, and respectively output the M channels of analog radio frequency signals to the M radio frequency transmitting circuits; and the radio frequency transmitting circuits are configured to transmit the received analog radio frequency signals by using the radio frequency transmit antennas; and the receiving subsystem includes:

M radio frequency receive antennas, M radio frequency receiving circuits respectively connected to the M radio frequency receive antennas, an analog combiner connected to the M radio frequency receiving circuits, an analog to digital converter ADC connected to the analog combiner, a digital splitter connected to the ADC, and M digital down converters connected to the digital splitter, where the M digital down converters are connected to the digital baseband unit, and M is an integer greater than or equal to 2; the radio frequency receiving circuits are configured to receive analog radio frequency signals by using the radio frequency receive antennas; the analog combiner is configured to up-convert M channels of analog radio frequency signals received by the M radio frequency receiving circuits into a high frequency band whose frequency is greater than or equal to 30 GHz, to obtain M channels of high frequency analog signals, and combine the M channels of high frequency analog signals into a channel of ultra-wideband high frequency analog signal; the ADC is configured to convert the ultra-wideband high frequency analog signal into an ultra-wideband high frequency digital signal; the digital splitter is configured to split the ultra-wideband high frequency digital signal into M channels of high frequency digital signals, down-convert the M channels of high frequency digital signals into M channels of digital radio frequency signals whose frequencies are less than 30 GHz, and respectively output the M channels of digital radio frequency signals to the M digital down converters; and the digital down converters are configured to down-convert the received digital radio frequency signals into baseband signals, and send the baseband signals to the digital baseband unit.

As can be seen from the above, according to the technical solutions in some embodiments of the present invention, M channels of to-be-transmitted digital radio frequency signals are up-converted into a high frequency band whose frequency is greater than or equal to 30 GHz, to perform combination; after conversion by a DAC, down-conversion into a radio frequency band whose frequency is less than 30 GHz is performed; and then transmission is performed, which is not limited by intermediate frequency bandwidth. In the high frequency band whose frequency is greater than or equal to 30 GHz, radio frequency signals to be transmitted on any multiple radio frequency channels can be combined into a channel of signal, thereby greatly reducing a quantity of DACs, simplifying a multichannel radio frequency apparatus, and reducing costs.

According to the technical solutions in some other embodiments of the present invention, M channels of received analog radio frequency signals are up-converted into a high frequency band whose frequency is greater than or equal to 30 GHz, to perform combination, and after conversion by a ADC, down-conversion into a radio frequency band whose frequency is less than 30 GHz is performed, which is not limited by intermediate frequency bandwidth. In the high frequency band whose frequency is greater than or equal to 30 GHz, radio frequency signals received on any multiple radio frequency channels can be combined into a channel of signal, thereby greatly reducing a quantity of ADCs, simplifying a multichannel radio frequency apparatus, and reducing costs.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a multichannel radio frequency apparatus and method, to resolve a problem of how to simplify a radio frequency apparatus and reduce a quantity of components in the radio frequency apparatus.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Detailed descriptions are separately provided below with reference to specific embodiments.

Figure 1:
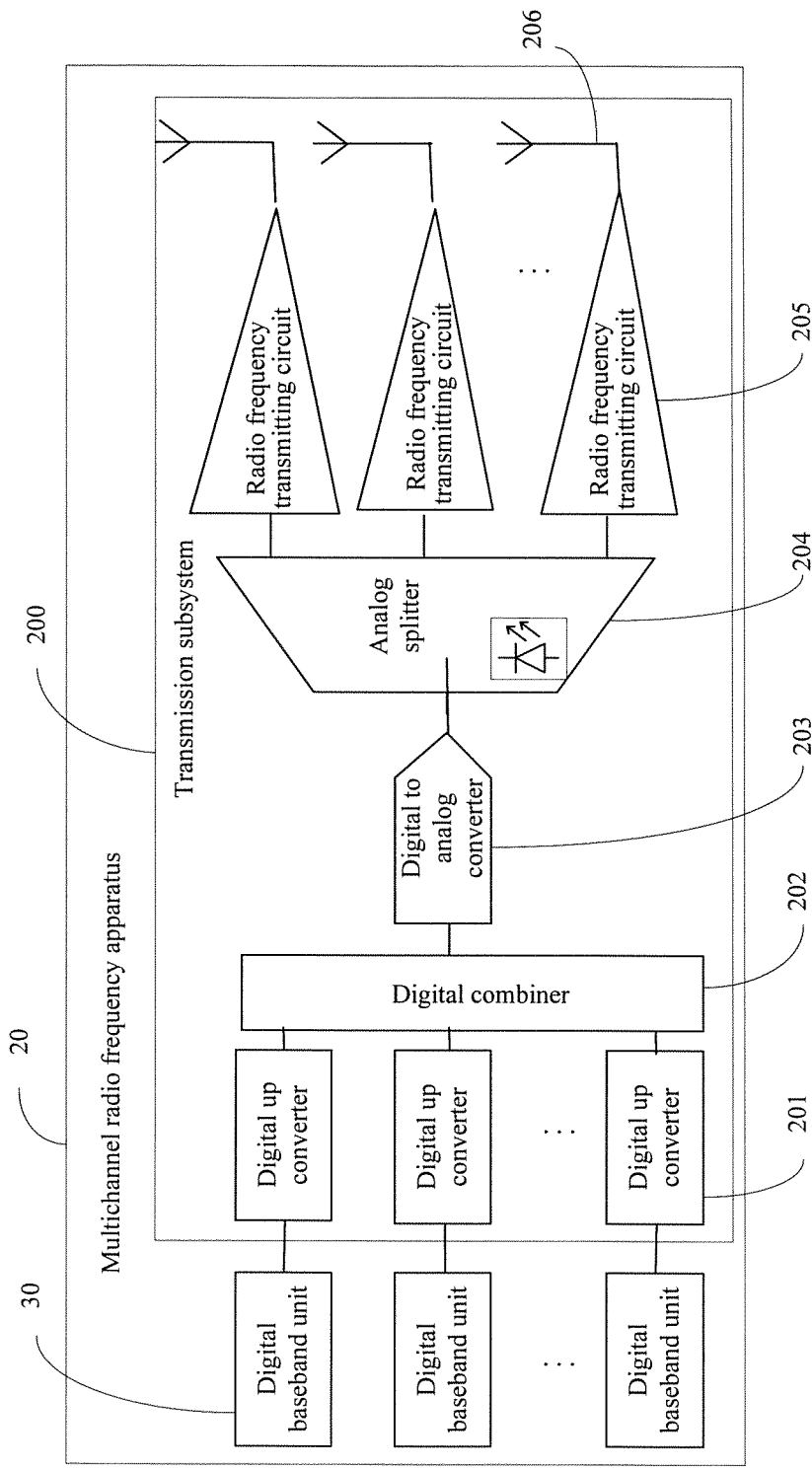
FIG. 1 is a schematic diagram of a multichannel radio frequency apparatus according to an embodiment of the present invention.

Referring to FIG. 1, an embodiment of the present invention provides a multichannel radio frequency apparatus 20 that may be applied to, but is not limited to, a communications base station. The multichannel radio frequency apparatus 20 may also be applied to various devices in a wireless communications system or a wireless transmission system, for example, a wireless access point (Access Point, AP) or terminal.

The multichannel radio frequency apparatus 20 includes a digital baseband unit 30. The digital baseband unit is configured to process a baseband signal, including generating a to-be-transmitted baseband signal, processing a received baseband signal, and the like. Generally, a field-programmable gate array (Field-Programmable Gate Array, FPGA), a central processing unit (Central Processing Unit, CPU) or the like may be used to implement a function of the digital baseband unit. In terms of physical structure, the digital baseband unit is a whole; in terms of logical function, the digital baseband unit may include multiple subunits. Each subunit may be configured to process a channel of baseband signal.

In this embodiment of the present invention, the multichannel radio frequency apparatus 20 further includes at least one transmission subsystem 200, where the transmission subsystem 200 may include:

M digital up converters 201 connected to the digital baseband unit 30, a digital combiner 202 connected to the M digital up converters 201, a digital to analog converter DAC 203 connected to the digital combiner 202, an analog splitter 204 connected to the DAC 203, M radio frequency transmitting circuits 205 connected to the analog splitter 204, and M radio frequency antennas 206 respectively connected to the M radio frequency transmitting circuits 205, where M is an integer greater than or equal to 2;

the digital up converters are configured to up-convert baseband signals generated by the digital baseband unit into digital radio frequency signals whose frequencies are less than 30 GHz;

the digital combiner is configured to obtain M channels of digital radio frequency signals from the M digital up converters, up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal;

the DAC is configured to convert the ultra-wideband high frequency digital signal into an ultra-wideband high frequency analog signal;

the analog splitter is configured to split the ultra-wideband high frequency analog signal into M channels of high frequency analog signals, down-convert the M channels of high frequency analog signals into M channels of analog radio frequency signals whose frequencies are less than 30 GHz, and respectively output the M channels of analog radio frequency signals to the M radio frequency transmitting circuits; and the radio frequency transmitting circuits are configured to transmit the received analog radio frequency signals by using the radio frequency antennas.

The foregoing components are described below in detail.

The digital up converters (Digital Up Converters, DUCs) may be configured to up-convert baseband signals generated by the digital baseband unit into digital radio frequency signals whose frequencies are less than 30 GHz. The baseband signals refer to original electrical signals. The baseband signals are characterized by a relatively low frequency, a signal spectrum starting from near a zero frequency, and a low-pass form. The baseband signals herein are digital baseband signals generated by the digital baseband unit. In a mobile communications technology, radio frequency signals are generally used for wireless communications. In a second-generation mobile communications technology (2G), for example, a GSM (Global System for Mobile Communication, Global System for Mobile Communications), radio frequency signals in frequency bands of 900 MHz and 1800 MHz are used. In a third-generation mobile communications technology (3G), radio frequency signals in a frequency band of about 1900 to 2100 MHz are generally used. In a fourth-generation mobile communications technology (4G), radio frequency signals infrequency bands of 700 (800) MHz/1.8 GHz/2.6 GHz are generally used. In a fifth-generation mobile communications technology (5G), radio frequency signals in a frequency band of less than 30 GHz are used. Without loss of generality, in this embodiment of the present invention, the digital up converter may up-convert the baseband signal into a frequency band whose frequency is less than 30 GHz. In this embodiment, the M digital up converters, the M radio frequency transmitting circuits, and the M radio frequency antennas are in a one-to-one correspondence with each other, to form M radio frequency channels, where each radio frequency channel corresponds to a different frequency. Therefore, the M digital up converters respectively up-convert different baseband signals into different radio frequency frequencies.

The digital combiner is configured to obtain M channels of digital radio frequency signals from the M digital up converters, up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal. In future wireless communications, bandwidth of each radio frequency channel may exceed 400 MHz. The digital combiner in this embodiment up-converts a digital radio frequency signal into a high frequency band whose frequency is greater than or equal to 30 GHz, that is, up-converts the digital radio frequency signal into a frequency band whose frequency is higher than a frequency, used in mobile communications, of a radio frequency signal, which is not limited by insufficient intermediate frequency bandwidth, so that any multiple channels of digital radio frequency signals can be combined into a channel of ultra-wideband digital signal, for example, 128 channels of digital radio frequency signals are combined into a channel of ultra-wideband digital signal. For different frequency bands, different digital combiners may be used for implementation. When there are a relatively small quantity of radio frequency channels, for example, less than 20 or 16 channels, digital radio frequency signals less than 30 GHz may be up-converted into a microwave frequency band whose frequency is between 30 GHz and 100 GHz, to form a channel of microwave carrier by means of combination. In this case, a high frequency combiner applicable to the microwave frequency band may be used, and correspondingly, a high frequency DAC applicable to the microwave frequency band and a high frequency splitter applicable to the microwave frequency band are needed. When there are a relatively large quantity of radio frequency channels, that is, over 20 channels or even over a hundred channels, for example, 128 channels, and bandwidth of each channel is 1 GHz, bandwidth of a frequency band of 30 GHz to 100 GHz is already insufficient. Therefore, digital radio frequency signals may be up-converted into a higher frequency, for example, the M channels of digital radio frequency signals may be up-converted into an optical frequency band whose frequency is greater than 167 THz, to form a channel of optical carrier by means of combination. In this case, an optical-to-electrical combiner applicable to the optical frequency band may be used, and correspondingly, an opticalto-electrical DAC applicable to the optical frequency band and an optical-to-electrical splitter applicable to the optical frequency band are needed.

The DAC is configured to convert the ultra-wideband high frequency digital signal into an ultra-wideband high frequency analog signal. Different DACs are used for different frequency bands, and in this embodiment of the present invention, DACs applicable to different frequency bands may be selected according to requirements. For example, when the digital combiner up-converts the digital radio frequency signals into a microwave frequency band of 30 GHz to 100 GHz, a high frequency DAC applicable to the microwave frequency band is selected; when the digital combiner up-converts the digital radio frequency signals into an optical frequency band greater than 167 THz, an optical-to-electrical DAC applicable to the optical frequency band is selected.

The analog splitter is configured to split the ultra-wideband high frequency analog signal into M channels of high frequency analog signals, down-convert the M channels of high frequency analog signals into M channels of analog radio frequency signals whose frequencies are less than 30 GHz, and respectively output the M channels of analog radio frequency signals to the M radio frequency transmitting circuits. In this embodiment of the present invention, the analog splitter may include two parts: a filter and a frequency converter, where the filter is configured to filer the ultra-wideband high frequency analog signal, to obtain the M channels of high frequency analog signals; and the frequency converter is configured to down-convert the M channels of high frequency analog signals into a radio frequency band whose frequency is less than 30 GHz, or in other words, restore a frequency of each channel of high frequency analog signal to a same frequency as an original digital radio frequency signal, to obtain the M channels of analog radio frequency signals. Frequencies of analog radio frequency signals on various radio frequency channels are different. In this embodiment of the present invention, analog splitters applicable to different frequency bands may be selected according to requirements. For example, when the digital combiner up-converts the digital radio frequency signals into a microwave frequency band of 30 GHz to 100 GHz, a high frequency splitter applicable to the microwave frequency band is selected; when the digital combiner up-converts the digital radio frequency signals into an optical frequency band greater than 167 THz, an optical-to-electrical splitter applicable to the optical frequency band is selected.

The radio frequency transmitting circuits are configured to transmit the received analog radio frequency signals by using the radio frequency antennas. The radio frequency transmitting circuits may specifically include power amplifiers, filters, and the like, and may perform modulation to transmit the analog radio frequency signals by using the radio frequency antennas.

In some embodiments of the present invention, when there are a relatively small quantity of radio frequency channels, the multichannel radio frequency apparatus may include only one transmission subsystem, and in this case, only one DAC needs to be used. In some other embodiments of the present invention, when there are a relatively large quantity of radio frequency channels, the multichannel radio frequency apparatus may include multiple transmission subsystems. For example, when there are 400 radio frequency channels, the multichannel radio frequency apparatus may include four transmission subsystems, where each transmission subsystem corresponds to 100 radio frequency channels, that is, each transmission subsystem includes 100 digital up converters, one digital combiner, one DAC, one analog splitter, 100 radio frequency transmitting circuits, and 100 radio frequency antennas; in this case, only four DACs are needed in total.

In the foregoing, some embodiments of the present invention disclose a multichannel radio frequency apparatus. According to the technical solution, M channels of to-be-transmitted digital radio frequency signals are up-converted into a high frequency band whose frequency is greater than or equal to 30 GHz, to perform combination; after conversion by a DAC, down-conversion into a radio frequency band whose frequency is less than 30 GHz is performed; and then transmission is performed, which is not limited by intermediate frequency bandwidth. In the high frequency band whose frequency is greater than or equal to 30 GHz, radio frequency signals to be transmitted on any multiple radio frequency channels can be combined into a channel of signal, thereby greatly reducing a quantity of DACs, simplifying a multichannel radio frequency apparatus, and reducing costs.

Figure 2:
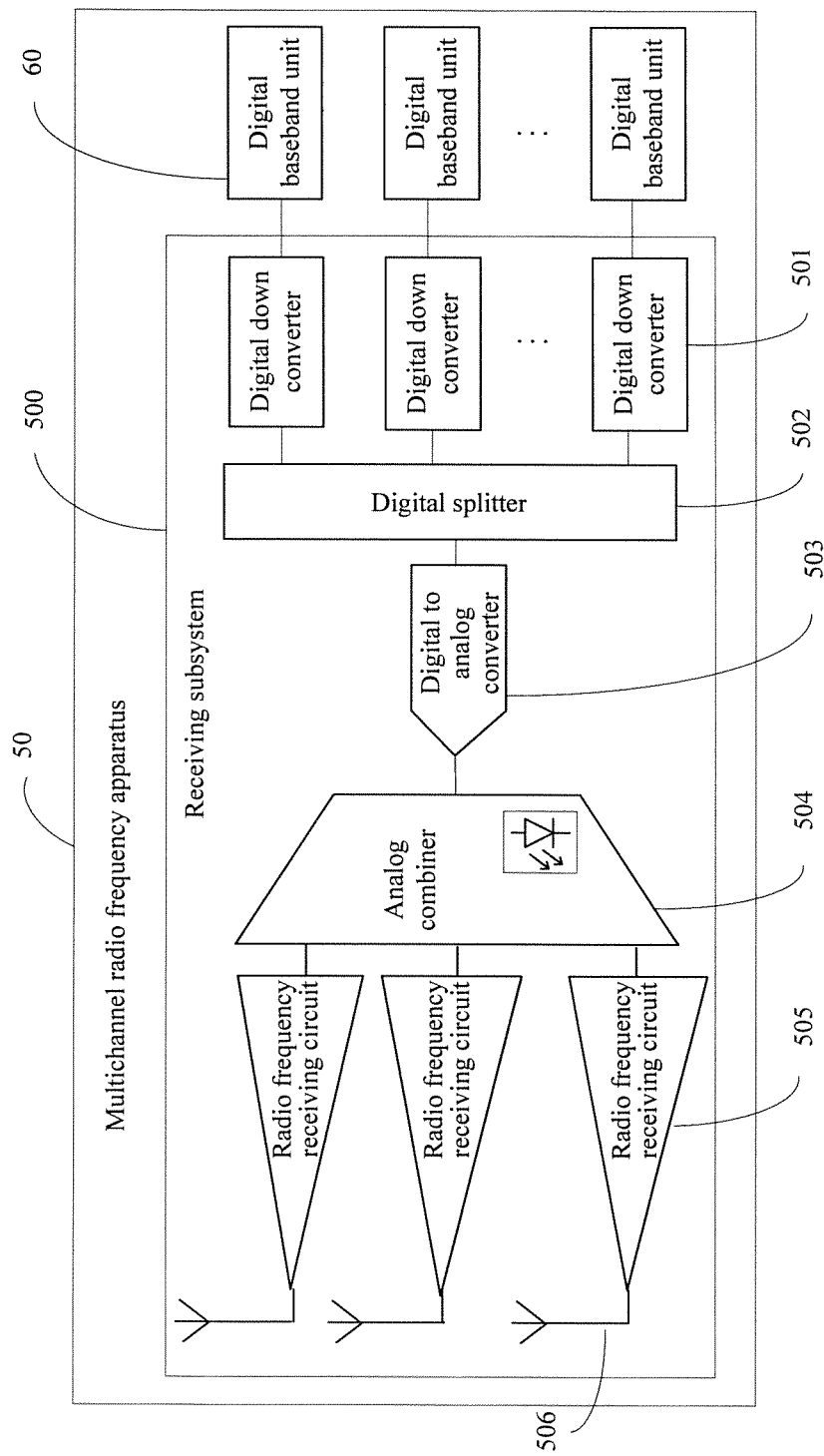
FIG. 2 is a schematic diagram of a multichannel radio frequency apparatus according to another embodiment of the present invention.

Referring to FIG. 2, an embodiment of the present invention provides a multichannel radio frequency apparatus 50 that may be applied to, but is not limited to, a communications base station. The multichannel radio frequency apparatus 50 may also be applied to various devices in a wireless communications system or a wireless transmission system, for example, a wireless access point (Access Point, AP) or terminal.

The multichannel radio frequency apparatus 50 includes a digital baseband unit 60. The digital baseband unit in the communications base station is configured to process a baseband signal, including generating a to-be-transmitted baseband signal, processing a received baseband signal, and the like. Generally, a field-programmable gate array (FPGA), a central processing unit (CPU) or the like may be used to implement a function of the digital baseband unit. In terms of physical structure, the digital baseband unit is a whole; in terms of logical function, the digital baseband unit may include multiple subunits, where each subunit may be configured to process a channel of baseband signal.

In this embodiment of the present invention, the multichannel radio frequency apparatus 50 further includes at least one receiving subsystem 500, where the receiving subsystem 500 may include:

M radio frequency antennas 506, M radio frequency receiving circuits 505 respectively connected to the M radio frequency antennas 506, an analog combiner 504 connected to the M radio frequency receiving circuits 505, an analog to digital converter ADC 503 connected to the analog combiner 504, a digital splitter 502 connected to the ADC 503, and M digital down converters 501 connected to the digital splitter 502, where the M digital down converters 501 are connected to the digital baseband unit 60, and M is an integer greater than or equal to 2;

the radio frequency receiving circuits are configured to receive analog radio frequency signals by using the radio frequency antennas;

the analog combiner is configured to up-convert M channels of analog radio frequency signals received by the M radio frequency receiving circuits into a high frequency band whose frequency is greater than or equal to 30 GHz, to obtain M channels of high frequency analog signals, and combine the M channels of high frequency analog signals into a channel of ultra-wideband high frequency analog signal;

the ADC is configured to convert the ultra-wideband high frequency analog signal into an ultra-wideband high frequency digital signal;

the digital splitter is configured to split the ultra-wideband high frequency digital signal into M channels of high frequency digital signals, down-convert the M channels of high frequency digital signals into M channels of digital radio frequency signals whose frequencies are less than 30 GHz, and respectively output the M channels of digital radio frequency signals to the M digital down converters; and the digital down converters are configured to down-convert the received digital radio frequency signals into baseband signals, and send the baseband signals to the digital baseband unit.

The foregoing components are described below in detail.

The radio frequency receiving circuits may specifically include power amplifiers, filters, and the like, and are configured to receive analog radio frequency signals by using the radio frequency antennas.

The analog combiner is configured to up-convert M channels of analog radio frequency signals received by the M radio frequency receiving circuits into a high frequency band whose frequency is greater than or equal to 30 GHz, to obtain M channels of high frequency analog signals, and combine the M channels of high frequency analog signals into a channel of ultra-wideband high frequency analog signal. In a mobile communications technology, radio frequency signals are generally used for wireless communications. In a second-generation mobile communications technology (2G), for example, a GSM (Global System for Mobile Communication, Global System for Mobile Communications), radio frequency signals in frequency bands of 900 MHz and 1800 MHz are used. In a third-generation mobile communications technology (3G), radio frequency signals in a frequency band of about 1900 to 2100 MHz are generally used. In a fourth-generation mobile communications technology (4G), radio frequency signals in frequency bands of 700 (800) MHz/1.8 GHz/2.6 GHz are generally used. In a fifth-generation mobile communications technology (5G), radio frequency signals in a frequency band of less than 30 GHz are used. In this embodiment of the present invention, frequencies of all the analog radio frequency signals received by the analog combiner do not exceed 30 GHz. In future wireless communications, bandwidth of an analog radio frequency signal received on each radio frequency channel may exceed 400 MHz. To avoid a limit of insufficient intermediate frequency bandwidth, in this embodiment of the present invention, the analog combiner up-converts a received analog radio frequency signal into a high frequency band whose frequency is greater than or equal to 30 GHz, that is, up-converts the analog radio frequency signal into a frequency band whose frequency is higher than a frequency, used in mobile communications, of a radio frequency signal, so that any multiple channels of analog radio frequency signals can be combined into a channel of ultra-wideband analog signal, for example, 128 channels of analog radio frequency signals are combined into a channel of ultra-wideband analog signal. For different frequency bands, different analog combiners may be used for implementation. When there are a relatively small quantity of radio frequency channels, for example, less than 20 or 16 channels, analog radio frequency signals less than 30 GHz may be up-converted into a microwave frequency band whose frequency is between 30 GHz and 100 GHz, to form a channel of microwave carrier by means of combination. In this case, a high frequency combiner applicable to the microwave frequency band may be used, and correspondingly, a high frequency ADC applicable to the microwave frequency band and a high frequency splitter applicable to the microwave frequency band are needed. When there are a relatively large quantity of radio frequency channels, that is, over 20 channels or even over a hundred channels, for example, 128 channels, and bandwidth of each channel is 1 GHz, bandwidth of a frequency band of 30 GHz to 100 GHz is already insufficient. Therefore, analog radio frequency signals may be up-converted into a higher frequency, for example, the M channels of analog radio frequency signals may be up-converted into an optical frequency band whose frequency is greater than 167 THz, to form a channel of optical carrier by means of combination. In this case, an optical-to-electrical combiner applicable to the optical frequency band may be used, and correspondingly, an optical-to-electrical ADC applicable to the optical frequency band and an optical-to-electrical splitter applicable to the optical frequency band are needed.

The ADC is configured to convert the ultra-wideband high frequency analog signal into an ultra-wideband high frequency digital signal. Different ADCs are used for different frequency bands, and in this embodiment of the present invention, ADCs applicable to different frequency bands may be selected according to requirements. For example, when the analog combiner up-converts the analog radio frequency signals into a microwave frequency band of 30 GHz to 100 GHz, a high frequency ADC applicable to the microwave frequency band is selected; when the analog combiner up-converts the analog radio frequency signals into an optical frequency band greater than 167 THz, an optical-to-electrical ADC applicable to the optical frequency band is selected.

The digital splitter is configured to split the ultra-wideband high frequency digital signal into M channels of high frequency digital signals, down-convert the M channels of high frequency digital signals into M channels of digital radio frequency signals whose frequencies are less than 30 GHz, and respectively output the M channels of digital radio frequency signals to the M digital down converters. In this embodiment of the present invention, the digital splitter may include two parts: a filter and a frequency converter, where the filter is configured to filer the ultra-wideband high frequency digital signal, to obtain the M channels of high frequency digital signals; and the frequency converter is configured to down-convert the M channels of high frequency digital signals into a radio frequency band whose frequency is less than 30 GHz, or in other words, restore a frequency of each channel of high frequency digital signal to a same frequency as an original analog radio frequency signal, to obtain the M channels of digital radio frequency signals. Frequencies of digital radio frequency signals on various radio frequency channels are different. In this embodiment of the present invention, digital splitters applicable to different frequency bands may be selected according to requirements. For example, when the analog combiner up-converts the analog radio frequency signals into a microwave frequency band of 30 GHz to 100 GHz, a high frequency splitter applicable to the microwave frequency band is selected; when the digital combiner up-converts the analog radio frequency signals into an optical frequency band greater than 167 THz, an optical-to-electrical splitter applicable to the optical frequency band is selected.

The digital down converters are configured to down-convert the received digital radio frequency signals into baseband signals, and send the baseband signals to the digital baseband unit. The baseband signals refer to original electrical signals. The baseband signals are characterized by a relatively low frequency, a signal spectrum starting from near a zero frequency, and a low-pass form. Herein, the digital down converters down-convert the received digital radio frequency signals into near a zero frequency to obtain baseband signals that can be processed by the digital baseband unit, and sends the baseband signals to the digital baseband unit for subsequent processing.

In some embodiments of the present invention, when there are a relatively small quantity of radio frequency channels, the multichannel radio frequency apparatus may include only one receiving subsystem, and in this case, only one ADC needs to be used. In some other embodiments of the present invention, when there are a relatively large quantity of radio frequency channels, the multichannel radio frequency apparatus may include multiple receiving subsystems. For example, when there are 400 radio frequency channels, the multichannel radio frequency apparatus may include four receiving subsystems, where each receiving subsystem corresponds to 100 radio frequency channels, that is, each receiving subsystem includes 100 digital down converters, one digital splitter, one ADC, one analog combiner, 100 radio frequency receiving circuits, and 100 radio frequency antennas; in this case, only four ADCs are needed in total.

In the foregoing, some embodiments of the present invention disclose a multichannel radio frequency apparatus. According to the technical solution, M channels of received analog radio frequency signals are up-converted into a high frequency band whose frequency is greater than or equal to 30 GHz, to perform combination, and after conversion by a ADC, down-conversion into a radio frequency band whose frequency is less than 30 GHz is performed, which is not limited by intermediate frequency bandwidth. In the high frequency band whose frequency is greater than or equal to 30 GHz, radio frequency signals received on any multiple radio frequency channels can be combined into a channel of signal, thereby greatly reducing a quantity of ADCs, simplifying a multichannel radio frequency apparatus, and reducing costs.

Figure 3:
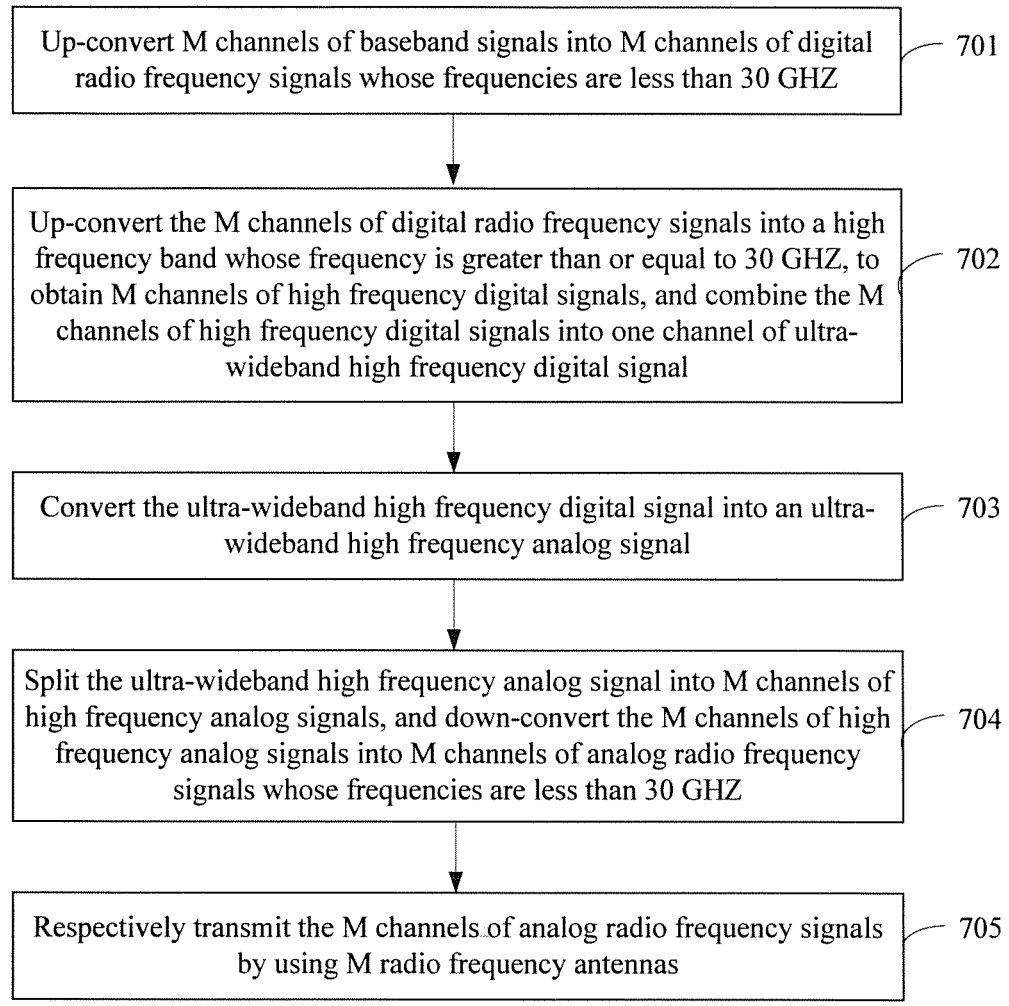
FIG. 3 is a schematic diagram of a multichannel radio frequency transmission method according to an embodiment of the present invention.

Referring to FIG. 3, an embodiment of the present invention provides a multichannel radio frequency transmission method. The method may include:

701: Up-convert M channels of baseband signals into M channels of digital radio frequency signals whose frequencies are less than 30 GHz.

The baseband signals refer to original electrical signals. The baseband signals are characterized by a relatively low frequency, a signal spectrum starting from near a zero frequency, and a low-pass form. The baseband signals herein may be digital baseband signals generated by a digital baseband unit of a communications base station. In a mobile communications technology, radio frequency signals are generally used for wireless communications. In a second-generation mobile communications technology (2G), for example, a GSM (Global System for Mobile Communication, Global System for Mobile Communications), radio frequency signals in frequency bands of 900 MHz and 1800 MHz are used. In a third-generation mobile communications technology (3G), radio frequency signals in a frequency band of about 1900 to 2100 MHz are generally used. In a fourth-generation mobile communications technology (4G), radio frequency signals in frequency bands of 700 (800) MHz/1.8 GHz/2.6 GHz are generally used. In a fifth-generation mobile communications technology (5G), radio frequency signals in a frequency band of less than 30 GHz are used. Without loss of generality, in this embodiment of the present invention, the baseband signals may be up-converted into a frequency band whose frequency is less than 30 GHz.

702: Up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal.

In future wireless communications, bandwidth of each radio frequency channel may exceed 400 MHz. The digital combiner in this embodiment up-converts a digital radio frequency signal into a high frequency band whose frequency is greater than or equal to 30 GHz, that is, up-converts the digital radio frequency signal into a frequency band whose frequency is higher than a frequency, used in mobile communications, of a radio frequency signal, which is not limited by insufficient intermediate frequency bandwidth, so that any multiple channels of digital radio frequency signals can be combined into a channel of ultra-wideband digital signal, for example, 128 channels of digital radio frequency signals are combined into a channel of ultra-wideband digital signal.

When there are a relatively small quantity of radio frequency channels, for example, M is less than 20 or 16 channels, digital radio frequency signals less than 30 GHz may be up-converted into a microwave frequency band whose frequency is between 30 GHz and 100 GHz, to form a channel of microwave carrier by means of combination. When there are a relatively large quantity of radio frequency channels, that is, M is over 20 channels or even over a hundred channels, for example, 128 channels, and bandwidth of each channel is 1 GHz, bandwidth of a frequency band of 30 GHz to 100 GHz is already insufficient. Therefore, digital radio frequency signals may be up-converted into a higher frequency, for example, the M channels of digital radio frequency signals may be up-converted into an optical frequency band whose frequency is greater than 167 THz, to form a channel of optical carrier by means of combination.

703: Convert the ultra-wideband high frequency digital signal into an ultra-wideband high frequency analog signal.

A DAC may be used for digital-to-analog conversion, to convert the ultra-wideband high frequency digital signal into an ultra-wideband high frequency analog signal.

704: Split the ultra-wideband high frequency analog signal into M channels of high frequency analog signals, and down-convert the M channels of high frequency analog signals into M channels of analog radio frequency signals whose frequencies are less than 30 GHz.

In this embodiment of the present invention, a filter may be used to filer the ultra-wideband high frequency analog signal, to obtain the M channels of high frequency analog signals; and a frequency converter may be used to down-convert the M channels of high frequency analog signals into a radio frequency band whose frequency is less than 30 GHz, or in other words, restore a frequency of each channel of high frequency analog signal to a same frequency as an original digital radio frequency signal, to obtain the M channels of analog radio frequency signals. Frequencies of analog radio frequency signals on various radio frequency channels are different.

705: Respectively transmit the M channels of analog radio frequency signals by using M radio frequency antennas.

Before the transmission is performed by using the radio frequency antennas, processing such as power amplification and filtering may be performed on the M channels of analog radio frequency signals. In a specific application, there may be different specific processing manners, which are not described in detail herein.

In some embodiments of the present invention, the up-converting the M channels of digital radio frequency signals into a high frequency band whose frequency is greater than or equal to 30 GHz may include: up-converting the M channels of digital radio frequency signals into a microwave frequency band whose frequency is between 30 GHz and 100 GHz.

In some other embodiments of the present invention, the up-converting the M channels of digital radio frequency signals into a high frequency band whose frequency is greater than or equal to 30 GHz may include: up-converting the M channels of digital radio frequency signals into an optical frequency band whose frequency is greater than 167 THz.

The method in this embodiment may be specifically executed by the multichannel radio frequency apparatus disclosed in the embodiment shown in FIG. 1.

In the foregoing, this embodiment of the present invention discloses a multichannel radio frequency transmission method. According to the technical solution in this method, M channels of to-be-transmitted digital radio frequency signals are up-converted into a high frequency band whose frequency is greater than or equal to 30 GHz, to perform combination; after conversion by a DAC, down-conversion into a radio frequency band whose frequency is less than 30 GHz is performed; and then transmission is performed, which is not limited by intermediate frequency bandwidth. In the high frequency band whose frequency is greater than or equal to 30 GHz, radio frequency signals to be transmitted on any multiple radio frequency channels can be combined into a channel of signal, thereby greatly reducing a quantity of DACs, simplifying a multichannel radio frequency apparatus, and reducing costs.

Figure 4:
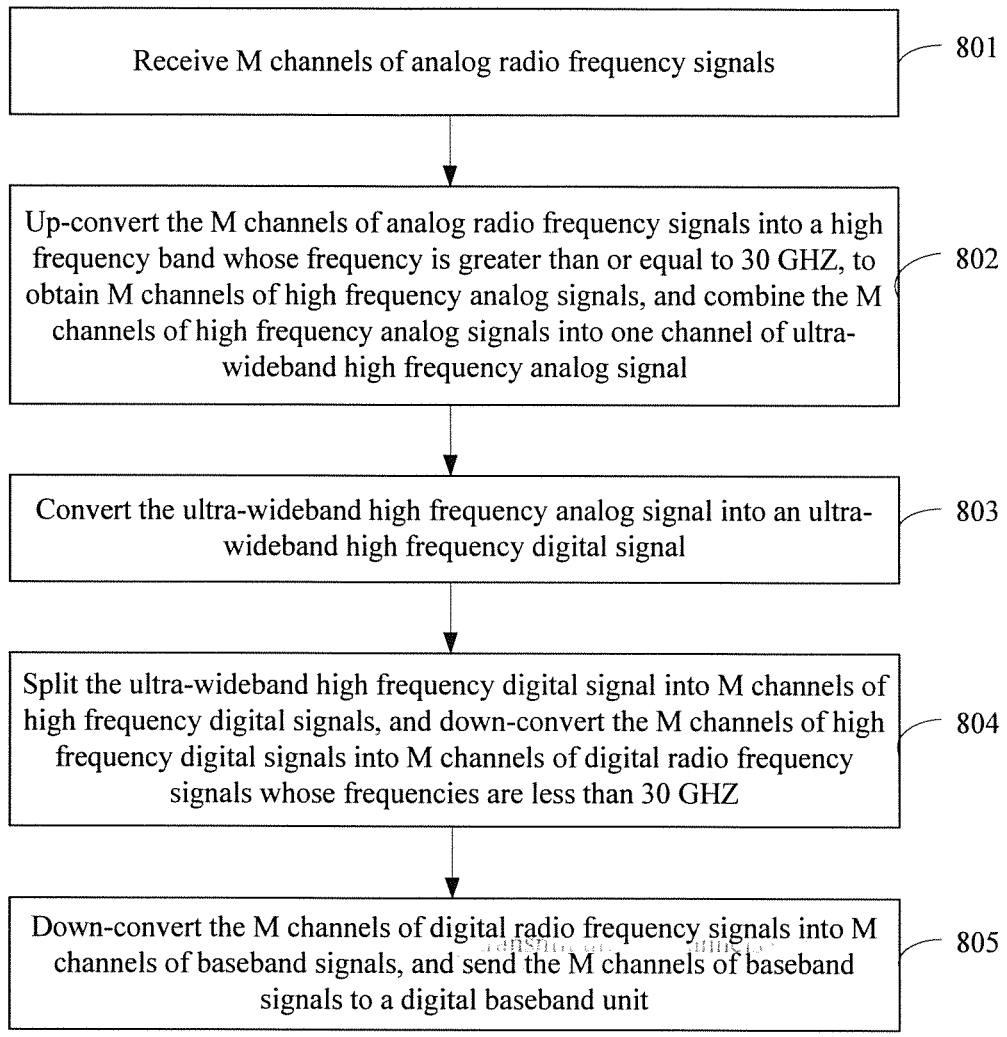
FIG. 4 is a schematic diagram of a multichannel radio frequency receiving method according to an embodiment of the present invention.

Referring to FIG. 4, an embodiment of the present invention provides a multichannel radio frequency receiving method. The method may include:

801: Receive M channels of analog radio frequency signals.

In a mobile communications technology, radio frequency signals are generally used for wireless communications. In a second-generation mobile communications technology (2G), for example, a GSM (Global System for Mobile Communication, Global System for Mobile Communications), radio frequency signals in frequency bands of 900 MHz and 1800 MHz are used. In a third-generation mobile communications technology (3G), radio frequency signals in a frequency band of about 1900 to 2100 MHz are generally used. In a fourth-generation mobile communications technology (4G), radio frequency signals in frequency bands of 700 (800) MHz/1.8 GHz/2.6 GHz are generally used. In a fifth-generation mobile communications technology (5G), radio frequency signals in a frequency band of less than 30 GHz are used. When this embodiment of the present invention is applied to a common mobile communications system, frequencies of the received analog radio frequency signals are generally less than 30 GHz.

802: Up-convert the M channels of analog radio frequency signals into a high frequency band whose frequency is greater than or equal to 30 GHz, to obtain M channels of high frequency analog signals, and combine the M channels of high frequency analog signals into a channel of ultra-wideband high frequency analog signal.

In future wireless communications, bandwidth of an analog radio frequency signal received on each radio frequency channel may exceed 400 MHz. To avoid a limit of insufficient intermediate frequency bandwidth, in this embodiment of the present invention, the analog combiner up-converts a received analog radio frequency signal into a high frequency band whose frequency is greater than or equal to 30 GHz, that is, up-converts the analog radio frequency signal into a frequency band whose frequency is higher than a frequency, used in mobile communications, of a radio frequency signal, so that any multiple channels of analog radio frequency signals can be combined into a channel of ultra-wideband analog signal, for example, 128 channels of analog radio frequency signals are combined into a channel of ultra-wideband analog signal.

When there are a relatively small quantity of radio frequency channels, for example, M is less than 20 or 16 channels, analog radio frequency signals less than 30 GHz may be up-converted into a microwave frequency band whose frequency is between 30 GHz and 100 GHz, to form a channel of microwave carrier by means of combination. When there are a relatively large quantity of radio frequency channels, that is, M is over 20 channels or even over a hundred channels, for example, 128 channels, and bandwidth of each channel is 1 GHz, bandwidth of a frequency band of 30 GHz to 100 GHz is already insufficient. Therefore, analog radio frequency signals may be up-converted into a higher frequency, for example, the M channels of analog radio frequency signals may be up-converted into an optical frequency band whose frequency is greater than 167 THz, to form a channel of optical carrier by means of combination.

803: Convert the ultra-wideband high frequency analog signal into an ultra-wideband high frequency digital signal.

An ADC may be used to convert the ultra-wideband high frequency analog signal into an ultra-wideband high frequency digital signal.

804: Split the ultra-wideband high frequency digital signal into M channels of high frequency digital signals, and down-convert the M channels of high frequency digital signals into M channels of digital radio frequency signals whose frequencies are less than 30 GHz.

In this embodiment of the present invention, a filter may be used to filer the ultra-wideband high frequency digital signal, to obtain the M channels of high frequency digital signals; and a frequency converter may be used to down-convert the M channels of high frequency digital signals into a radio frequency band whose frequency is less than 30 GHz, or in other words, restore a frequency of each channel of high frequency digital signal to a same frequency as an original analog radio frequency signal, to obtain the M channels of digital radio frequency signals. Frequencies of digital radio frequency signals on various radio frequency channels are different.

805: Down-convert the M channels of digital radio frequency signals into M channels of baseband signals, and send the M channels of baseband signals to a digital baseband unit.

In this embodiment, the M channels of digital radio frequency signals are down-converted into M channels of baseband signals, and the M channels of baseband signals are sent to a digital baseband unit for processing. The baseband signals refer to original electrical signals. The baseband signals are characterized by a relatively low frequency, a signal spectrum starting from near a zero frequency, and a low-pass form. In this embodiment, the received digital radio frequency signals may be down-converted into near a zero frequency to obtain baseband signals that can be processed by the digital baseband unit, and the baseband signals are sent to the digital baseband unit for subsequent processing.

In some embodiments of the present invention, the up-converting the M channels of analog radio frequency signals into a high frequency band whose frequency is greater than or equal to 30 GHz may include: up-converting the M channels of analog radio frequency signals into a microwave frequency band whose frequency is between 30 GHz and 100 GHz.

In some other embodiments of the present invention, the up-converting the M channels of analog radio frequency signals into a high frequency band whose frequency is greater than or equal to 30 GHz may include: up-converting the M channels of analog radio frequency signals into an optical frequency band whose frequency is greater than 167 THz.

In the foregoing, this embodiment of the present invention discloses a multichannel radio frequency receiving method. According to the technical solution in this method, M channels of received analog radio frequency signals are up-converted into a high frequency band whose frequency is greater than or equal to 30 GHz, to perform combination, and after conversion by a ADC, down-conversion into a radio frequency band whose frequency is less than 30 GHz is performed, which is not limited by intermediate frequency bandwidth. In the high frequency band whose frequency is greater than or equal to 30 GHz, radio frequency signals received on any multiple radio frequency channels can be combined into a channel of signal, thereby greatly reducing a quantity of ADCs, simplifying a multichannel radio frequency apparatus, and reducing costs.

In the foregoing, the embodiments of the present invention provide two types of multichannel radio frequency apparatuses, where the multichannel radio frequency apparatus shown in FIG. 1 includes a transmission subsystem and the multichannel radio frequency apparatus shown in FIG. 2 includes a receiving subsystem, and provide a multichannel radio frequency transmission method and a multichannel radio frequency receiving method that respectively correspond to the two types of multichannel radio frequency apparatuses. It can be understood that in some other embodiments of the present invention, the provided multichannel radio frequency apparatuses may include both the transmission subsystem and the receiving subsystem.

Figure 5:
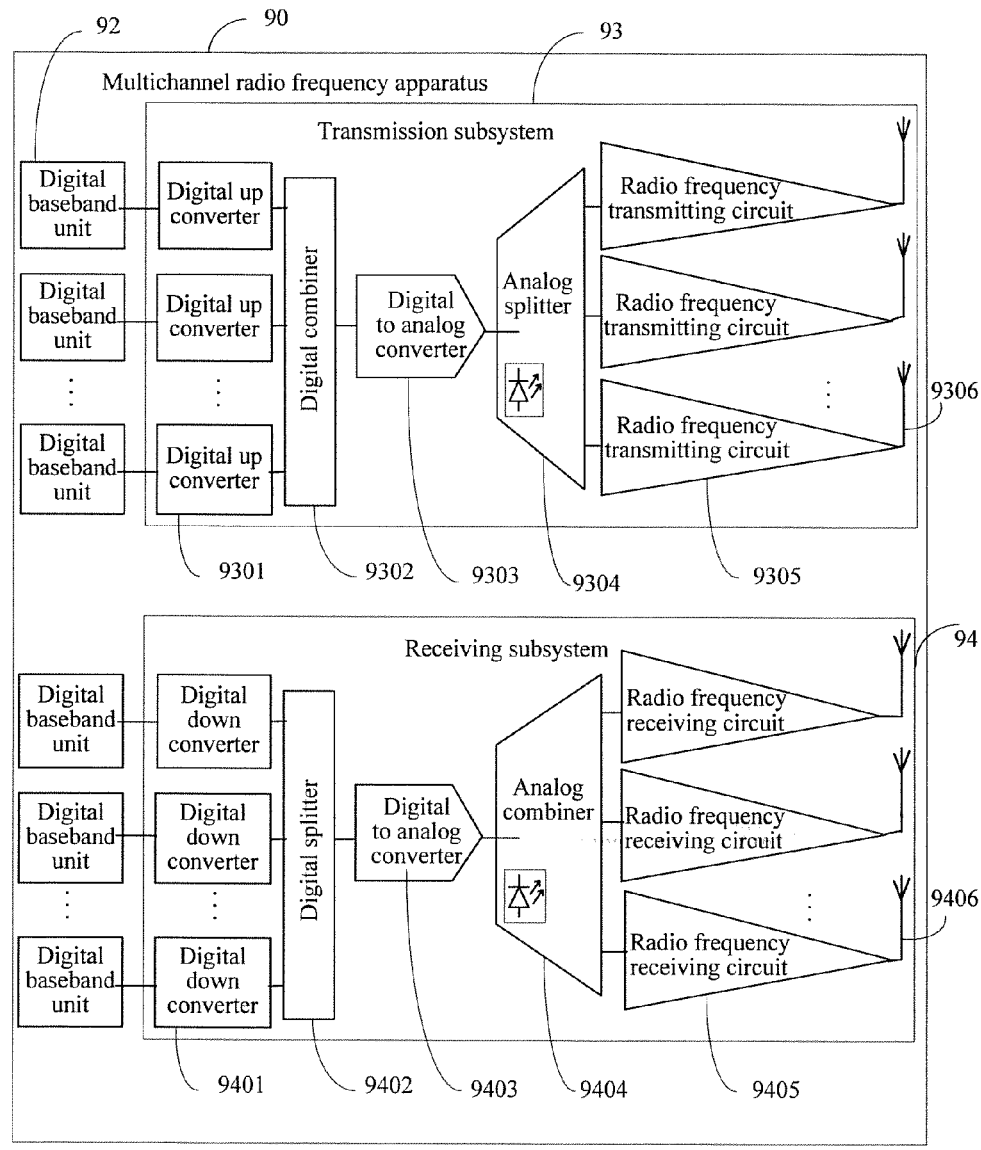
FIG. 5 is a schematic diagram of a multichannel radio frequency apparatus according to still another embodiment of the present invention.

As shown in FIG. 5, an embodiment of the present invention provides a multichannel radio frequency apparatus 90 applied to a communications base station. The multichannel radio frequency apparatus 90 includes a digital baseband unit 92, at least one transmission subsystem 93, and at least one receiving subsystem 94.

The transmission subsystem 93 may include:

M digital up converters 9301 connected to the digital baseband unit 92, a digital combiner 9302 connected to the M digital up converters 9301, a digital to analog converter DAC 9303 connected to the digital combiner 9302, an analog splitter 9304 connected to the DAC 9303, M radio frequency transmitting circuits 9305 connected to the analog splitter 9304, and M radio frequency transmit antennas 9306 respectively connected to the M radio frequency transmitting circuits 9305, where M is an integer greater than or equal to 2;

the digital up converters are configured to up-convert baseband signals generated by the digital baseband unit into digital radio frequency signals whose frequencies are less than 30 GHz;

the digital combiner is configured to obtain M channels of digital radio frequency signals from the M digital up converters, up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal;

the DAC is configured to convert the ultra-wideband high frequency digital signal into an ultra-wideband high frequency analog signal;

the analog splitter is configured to split the ultra-wideband high frequency analog signal into M channels of high frequency analog signals, down-convert the M channels of high frequency analog signals into M channels of analog radio frequency signals whose frequencies are less than 30 GHz, and respectively output the M channels of analog radio frequency signals to the M radio frequency transmitting circuits; and the radio frequency transmitting circuits are configured to transmit the received analog radio frequency signals by using the radio frequency transmit antennas.

The receiving subsystem 94 may include:

N radio frequency receive antennas 9406, N radio frequency receiving circuits 9405 respectively connected to the N radio frequency receive antennas 9406, an analog combiner 9404 connected to the N radio frequency receiving circuits 9405, an analog to digital converter ADC 9403 connected to the analog combiner 9404, a digital splitter 9402 connected to the ADC 9403, and N digital down converters 9401 connected to the digital splitter 9402, where the N digital down converters 9401 are connected to the digital baseband unit 92, and N is an integer greater than or equal to 2;

the radio frequency receiving circuits are configured to receive analog radio frequency signals by using the radio frequency receive antennas;

the analog combiner is configured to up-convert N channels of analog radio frequency signals received by the N radio frequency receiving circuits into a high frequency band whose frequency is greater than or equal to 30 GHz, to obtain N channels of high frequency analog signals, and combine the M channels of high frequency analog signals into a channel of ultra-wideband high frequency analog signal;

the ADC is configured to convert the ultra-wideband high frequency analog signal into an ultra-wideband high frequency digital signal;

the digital splitter is configured to split the ultra-wideband high frequency digital signal into M channels of high frequency digital signals, down-convert the M channels of high frequency digital signals into M channels of digital radio frequency signals whose frequencies are less than 30 GHz, and respectively output the M channels of digital radio frequency signals to the M digital down converters; and the digital down converters are configured to down-convert the received digital radio frequency signals into baseband signals, and send the baseband signals to the digital baseband unit.

N may be equal or unequal to M.

The radio frequency receive antennas and the radio frequency transmit antennas may be two independent sets of radio frequency antennas, or may be a same set of radio frequency antennas that work in a duplex mode and that serve as both radio frequency receive antennas and radio frequency transmit antennas.

In some embodiments of the present invention, when there are a relatively small quantity of radio frequency channels, the multichannel radio frequency apparatus may include only one transmission subsystem and one receiving subsystem, and in this case, only one DAC and one ADC need to be used. In some other embodiments of the present invention, when there are a relatively large quantity of radio frequency channels, the multichannel radio frequency apparatus may include multiple transmission subsystems and multiple receiving subsystems.

In some embodiments of the present invention, the digital combiner is specifically configured to up-convert the M channels of digital radio frequency signals into a microwave frequency band whose frequency is between 30 GHz and 100 GHz; the DAC is a high frequency DAC applicable to the microwave frequency band; and the analog splitter is a high frequency splitter applicable to the microwave frequency band.

The analog combiner is specifically configured to up-convert the M channels of analog radio frequency signals into a microwave frequency band whose frequency is between 30 GHz and 100 GHz; and the ADC is a high frequency ADC applicable to the microwave frequency band.

In some embodiments of the present invention, the digital combiner is specifically configured to up-convert the M channels of digital radio frequency signals into an optical frequency band whose frequency is greater than 167 THz; the DAC is an optical-to-electrical DAC applicable to the optical frequency band; and the analog splitter is an optical-to-electrical splitter applicable to the optical frequency band.

The analog combiner is specifically configured to up-convert the M channels of analog radio frequency signals into an optical frequency band whose frequency is greater than 167 THz; and the ADC is an optical-to-electrical ADC applicable to the optical frequency band.

In some embodiments of the present invention, the analog splitter includes:

a filter, configured to filter the ultra-wideband high frequency analog signal, to obtain the M channels of high frequency analog signals; and a frequency converter, configured to down-convert the M channels of high frequency analog signals into a radio frequency band whose frequency is less than 30 GHz, to obtain the M channels of analog radio frequency signals.

In some embodiments of the present invention, the digital splitter includes:

a filter, configured to filter the ultra-wideband high frequency digital signal, to obtain the M channels of high frequency digital signals; and a frequency converter, configured to down-convert the M channels of high frequency digital signals into a radio frequency band whose frequency is less than 30 GHz, to obtain the M channels of digital radio frequency signals.

As can be seen from the above, according to the technical solution in this embodiment of the present invention, M channels of to-be-transmitted digital radio frequency signals are up-converted into a high frequency band whose frequency is greater than or equal to 30 GHz, to perform combination; after conversion by a DAC, down-conversion into a radio frequency band whose frequency is less than 30 GHz is performed; and then transmission is performed, which is not limited by intermediate frequency bandwidth. In the high frequency band whose frequency is greater than or equal to 30 GHz, radio frequency signals to be transmitted on any multiple radio frequency channels can be combined into a channel of signal, thereby greatly reducing a quantity of DACs. According to the technical solution, M channels of received analog radio frequency signals are up-converted into a high frequency band whose frequency is greater than or equal to 30 GHz, to perform combination, and after conversion by a ADC, down-conversion into a radio frequency band whose frequency is less than 30 GHz is performed, which is not limited by intermediate frequency bandwidth. In the high frequency band whose frequency is greater than or equal to 30 GHz, radio frequency signals received on any multiple radio frequency channels can be combined into a channel of signal, thereby greatly reducing a quantity of ADCs. In this way, a multichannel radio frequency apparatus is simplified, and costs are reduced.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should know that the present invention is not limited to the described sequence of the actions, because some steps may be performed in another sequence or performed at the same time according to the present invention. In addition, a person skilled in the art should also know that the embodiments described in this specification are exemplary embodiments, and the related actions and modules are not necessarily mandatory for the present invention.

A person of ordinary skill in the art may understand that all or a part of the steps of the methods in the foregoing embodiments may be implemented by a program instructing related hardware. The program may be stored in a computer-readable storage medium. The storage medium may include: a ROM, a RAM, a magnetic disk, an optical disc, or the like.

The multichannel radio frequency apparatus and method provided in the embodiments of the present invention are described in detail above. The principles and implementation manners of the present invention are elaborated in this specification by using specific examples. The description about the foregoing embodiments is merely provided to help understand the method and the core ideas of the method. In addition, a person of ordinary skill in the art can make changes to specific implementations and application scopes according to the ideas of the present invention. Therefore, the content in this specification shall not be construed as a limit to the present invention.

What is claimed is:

1. A multichannel radio frequency apparatus, comprising:
a digital baseband unit; and
at least one transmission subsystem, comprising:
M digital up converters connected to the digital baseband unit and configured to up-convert baseband signals generated by the digital baseband unit into digital radio frequency signals whose frequencies are less than 30 GHz, wherein M is an integer greater than or equal to 2,
a digital combiner connected to the M digital up converters and configured to obtain M channels of digital radio frequency signals from the M digital up converters, up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal, a digital to analog converter (DAC) connected to the digital combiner and configured to convert the ultra-wideband high frequency digital signal into an ultra-wideband high frequency analog signal, an analog splitter connected to the DAC and configured to split the ultra-wideband high frequency analog signal into M channels of high frequency analog signals, down-convert the M channels of high frequency analog signals into M channels of analog radio frequency signals whose frequencies are less than 30 GHz, and respectively output the M channels of analog radio frequency signals, and M radio frequency transmitting circuits connected to the analog splitter and configured to receive and transmit the M channels of analog radio frequency signals by using M radio frequency antennas.

2. The multichannel radio frequency apparatus according to claim 1, wherein:
the digital combiner is configured to up-convert the M channels of digital radio frequency signals into a microwave frequency band whose frequency is between 30 GHz and 100 GHz;
the DAC is a high frequency DAC applicable to the microwave frequency band; and
the analog splitter is a high frequency splitter applicable to the microwave frequency band.

3. The multichannel radio frequency apparatus according to claim 2, wherein the analog splitter comprises:
a filter, configured to filter the ultra-wideband high frequency analog signal, to obtain the M channels of high frequency analog signals; and
a frequency converter, configured to down-convert the M channels of high frequency analog signals into a radio frequency band whose frequency is less than 30 GHz, to obtain the M channels of analog radio frequency signals.

4. The multichannel radio frequency apparatus according to claim 1, wherein:
the digital combiner is configured to up-convert the M channels of digital radio frequency signals into an optical frequency band whose frequency is greater than 167 THz;
the DAC is an optical-to-electrical DAC applicable to the optical frequency band; and
the analog splitter is an optical-to-electrical splitter applicable to the optical frequency band.

5. The multichannel radio frequency apparatus according to claim 4, wherein the analog splitter comprises:
a filter, configured to filter the ultra-wideband high frequency analog signal, to obtain the M channels of high frequency analog signals; and
a frequency converter, configured to down-convert the M channels of high frequency analog signals into a radio frequency band whose frequency is less than 30 GHz, to obtain the M channels of analog radio frequency signals.

6. The multichannel radio frequency apparatus according to claim 1, wherein the analog splitter comprises:
a filter, configured to filter the ultra-wideband high frequency analog signal, to obtain the M channels of high frequency analog signals; and
a frequency converter, configured to down-convert the M channels of high frequency analog signals into a radio frequency band whose frequency is less than 30 GHz, to obtain the M channels of analog radio frequency signals.

7. A multichannel radio frequency apparatus, comprising:
a digital baseband unit; and
at least one receiving subsystem, comprising:
M radio frequency receiving circuits configured to receive analog radio frequency signals by using M radio frequency antennas, wherein M is an integer greater than or equal to 2, an analog combiner connected to the M radio frequency receiving circuits and configured to up-convert M channels of analog radio frequency signals received by the M radio frequency receiving circuits into a high frequency band whose frequency is greater than or equal to 30 GHz, obtain M channels of high frequency analog signals, and combine the M channels of high frequency analog signals into a channel of ultra-wideband high frequency analog signal, an analog to digital converter (ADC) connected to the analog combiner and configured to convert the ultra-wideband high frequency analog signal into an ultra-wideband high frequency digital signal, a digital splitter connected to the ADC and configured to split the ultra-wideband high frequency digital signal into M channels of high frequency digital signals, down-convert the M channels of high frequency digital signals into M channels of digital radio frequency signals whose frequencies are less than 30 GHz, and respectively output the M channels of digital radio frequency signals, and M digital down converters connected to the digital splitter and configured to down-convert the M channels of digital radio frequency signals into baseband signals, and send the baseband signals to the digital baseband unit.

8. The multichannel radio frequency apparatus according to claim 7, wherein:
the analog combiner is configured to up-convert the M channels of analog radio frequency signals into a microwave frequency band whose frequency is between 30 GHz and 100 GHz; and
the ADC is a high frequency ADC applicable to the microwave frequency band.

9. The multichannel radio frequency apparatus according to claim 8, wherein the digital splitter comprises:
a filter, configured to filter the ultra-wideband high frequency digital signal, to obtain the M channels of high frequency digital signals; and
a frequency converter, configured to down-convert the M channels of high frequency digital signals into a radio frequency band whose frequency is less than 30 GHz, to obtain the M channels of digital radio frequency signals.

10. The multichannel radio frequency apparatus according to claim 7, wherein:
the analog combiner is configured to up-convert the M channels of analog radio frequency signals into an optical frequency band whose frequency is greater than 167 THz; and
the ADC is an optical-to-electrical ADC applicable to the optical frequency band.

11. The multichannel radio frequency apparatus according to claim 10, wherein the digital splitter comprises:
a filter, configured to filter the ultra-wideband high frequency digital signal, to obtain the M channels of high frequency digital signals; and
a frequency converter, configured to down-convert the M channels of high frequency digital signals into a radio frequency band whose frequency is less than 30 GHz, to obtain the M channels of digital radio frequency signals.

12. The multichannel radio frequency apparatus according to claim 7, wherein the digital splitter comprises:
   a filter, configured to filter the ultra-wideband high frequency digital signal, to obtain the M channels of high frequency digital signals; and
   a frequency converter, configured to down-convert the M channels of high frequency digital signals into a radio frequency band whose frequency is less than 30 GHz, to obtain the M channels of digital radio frequency signals.

13. A multichannel radio frequency transmission method, the method comprising:
   up-converting M channels of baseband signals into M channels of digital radio frequency signals whose frequencies are less than 30 GHz, wherein M is an integer greater than or equal to 2;
   up-converting the M channels of digital radio frequency signals into a high frequency band whose frequency is greater than or equal to 30 GHz, to obtain M channels of high frequency digital signals, and combining the M channels of high frequency digital signals into a channel of ultra-wideband high frequency digital signal;
   converting the ultra-wideband high frequency digital signal into an ultra-wideband high frequency analog signal;
   splitting the ultra-wideband high frequency analog signal into M channels of high frequency analog signals, and down-converting the M channels of high frequency analog signals into M channels of analog radio frequency signals whose frequencies are less than 30 GHz; and
   respectively transmitting the M channels of analog radio frequency signals by using M radio frequency antennas.

14. The method according to claim 13, wherein up-converting the M channels of digital radio frequency signals into a high frequency band whose frequency is greater than or equal to 30 GHz comprises:
   up-converting the M channels of digital radio frequency signals into a microwave frequency band whose frequency is between 30 GHz and 100 GHz.

15. The method according to claim 13, wherein up-converting the M channels of digital radio frequency signals into a high frequency band whose frequency is greater than or equal to 30 GHz comprises:
   up-converting the M channels of digital radio frequency signals into an optical frequency band whose frequency is greater than 167 THz.

16. A multichannel radio frequency receiving method, the method comprising:
   receiving M channels of analog radio frequency signals, wherein M is an integer greater than or equal to 2;
   up-converting the M channels of analog radio frequency signals into a high frequency band whose frequency is greater than or equal to 30 GHz, to obtain M channels of high frequency analog signals, and combining the M channels of high frequency analog signals into a channel of ultra-wideband high frequency analog signal;
   converting the ultra-wideband high frequency analog signal into an ultra-wideband high frequency digital signal;
   splitting the ultra-wideband high frequency digital signal into M channels of high frequency digital signals, and down-converting the M channels of high frequency digital signals into M channels of digital radio frequency signals whose frequencies are less than 30 GHz; and
   down-converting the M channels of digital radio frequency signals into M channels of baseband signals, and sending the M channels of baseband signals to a digital baseband unit.

17. The method according to claim 16, wherein up-converting the M channels of analog radio frequency signals into a high frequency band whose frequency is greater than or equal to 30 GHz comprises:
   up-converting the M channels of analog radio frequency signals into a microwave frequency band whose frequency is between 30 GHz and 100 GHz.

18. The method according to claim 16, wherein up-converting the M channels of analog radio frequency signals into a high frequency band whose frequency is greater than or equal to 30 GHz comprises:
   up-converting the M channels of analog radio frequency signals into an optical frequency band whose frequency is greater than 167 THz.

19. A multichannel radio frequency apparatus, comprising:
   a digital baseband unit;
   at least one transmission subsystem, comprising:
      M digital up converters connected to the digital baseband unit and configured to up-convert baseband signals generated by the digital baseband unit into digital radio frequency signals whose frequencies are less than 30 GHz, wherein M is an integer greater than or equal to 2,
      a digital combiner connected to the M digital up converters and configured to obtain M channels of digital radio frequency signals from the M digital up converters, up-convert the M channels of digital radio frequency signals into a high frequency band whose frequency is greater than or equal to 30 GHz, to obtain M channels of high frequency digital signals, and combine the M channels of high frequency digital signals into a channel of ultra-wideband high frequency digital signal,
      a digital to analog converter (DAC) connected to the digital combiner and configured to convert the ultra-wideband high frequency digital signal into an ultra-wideband high frequency analog signal,
      an analog splitter connected to the DAC and configured to split the ultra-wideband high frequency analog signal into M channels of high frequency analog signals, down-convert the M channels of high frequency analog signals into M channels of analog radio frequency signals whose frequencies are less than 30 GHz, and respectively output the M channels of analog radio frequency signals, and
      M radio frequency transmitting circuits connected to the analog splitter and configured to receive and transmit the M channels of analog radio frequency signals by using M radio frequency antennas; and
   at least one receiving subsystem, comprising:
      M radio frequency receiving circuits configured to receive analog radio frequency signals by using M radio frequency antennas, wherein M is an integer greater than or equal to 2,
      an analog combiner connected to the M radio frequency receiving circuits and configured to up-convert M channels of analog radio frequency signals received by the M radio frequency receiving circuits into a high frequency band whose frequency is greater than or equal to 30 GHz, obtain M channels of high frequency analog signals, and combine the M channels of high frequency analog signals into a channel of ultra-wideband high frequency analog signal, an analog to digital converter (ADC) connected to the analog combiner and configured to convert the ultra-wideband high frequency analog signal into an ultra-wideband high frequency digital signal, a digital splitter connected to the ADC and configured to split the ultra-wideband high frequency digital signal into M channels of high frequency digital signals, down-convert the M channels of high frequency digital signals into M channels of digital radio frequency signals whose frequencies are less than 30 GHz, and respectively output the M channels of digital radio frequency signals, and M digital down converters connected to the digital splitter and configured to down-convert the M channels of digital radio frequency signals into baseband signals, and send the baseband signals to the digital baseband unit.

* * * * *